(12) United States Patent
Kim et al.

(10) Patent No.: US 10,086,881 B2
(45) Date of Patent: Oct. 2, 2018

(54) FRONT VEHICLE BODY STRUCTURE

(71) Applicant: Hyundai Motor Company, Seoul (KR)

(72) Inventors: Heeju Kim, Seoul (KR); Yoonkyoung Han, Gyeonggi-do (KR); Mun Soo Cha, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 224 days.

(21) Appl. No.: 15/191,980

(22) Filed: Jun. 24, 2016

(65) Prior Publication Data
US 2017/0166259 A1 Jun. 15, 2017

(30) Foreign Application Priority Data
Dec. 14, 2015 (KR) .......................... 10-2015-0178254

(51) Int. Cl.
B62D 27/02 (2006.01)
B62D 25/04 (2006.01)
B62D 25/08 (2006.01)
B62D 29/00 (2006.01)

(52) U.S. Cl.
CPC ........... B62D 27/023 (2013.01); B62D 25/04 (2013.01); B62D 25/08 (2013.01); B62D 25/081 (2013.01); B62D 25/082 (2013.01); B62D 29/008 (2013.01)

(58) Field of Classification Search
CPC .. B62D 27/023; B62D 29/008; B62D 25/082; B62D 25/081; B62D 25/08; B62D 25/04
USPC ..... 296/203.02, 192, 193.06, 193.09, 29, 30
See application file for complete search history.

(56) References Cited

U.S. PATENT DOCUMENTS

| 4,078,840 A | * | 3/1978 | Itoh | ...................... | B62D 25/081 |
| | | | | | 296/192 |
| 4,573,734 A | * | 3/1986 | Gass | .................... | B62D 21/152 |
| | | | | | 293/134 |
| 5,052,742 A | * | 10/1991 | Akoshima | ............ | B62D 25/081 |
| | | | | | 296/192 |

(Continued)

FOREIGN PATENT DOCUMENTS

JP 5332129 B2 11/2013
KR 2008-0028103 A 3/2008

(Continued)

Primary Examiner — Jason S Morrow
Assistant Examiner — E Turner Hicks
(74) Attorney, Agent, or Firm — Mintz Levin Cohn Ferris Glovsky and Popeo, P.C.; Peter F. Corless

(57) ABSTRACT

A front vehicle body structure is provided. The front vehicle body structure includes fender apron upper members that extend longitudinally and disposed in left and right sides of the front vehicle body in a width direction, respectively. Front pillar members traversely extend and are disposed in the left and right sides of the front vehicle body in the width direction, respectively. A cowl upper cross reinforcing member extends in the width direction. Further, front pillar upper members longitudinally extend and are disposed in left and right sides of the front vehicle body in the width direction, respectively, and are disposed rearward of the longitudinal direction and upward of the transverse direction against the fender apron upper member. Further, a joint is coupled with front ends of the fender apron upper members, the front pillar members, the front pillar upper members, and the cowl upper cross reinforcing member, respectively.

17 Claims, 32 Drawing Sheets

(56) References Cited

U.S. PATENT DOCUMENTS

| | | | | |
|---|---|---|---|---|
| 5,458,393 A | * | 10/1995 | Benedyk | B62D 23/005 |
| | | | | 280/798 |
| 6,412,857 B2 | * | 7/2002 | Jaekel | B62D 23/005 |
| | | | | 296/203.04 |
| 7,267,394 B1 | * | 9/2007 | Mouch | B62D 25/04 |
| | | | | 296/187.09 |
| 7,322,106 B2 | * | 1/2008 | Marando | B22D 19/045 |
| | | | | 29/507 |
| 9,884,663 B2 | * | 2/2018 | Czinger | B62D 65/02 |
| 2008/0169682 A1 | * | 7/2008 | Hedderly | B62D 25/08 |
| | | | | 296/193.08 |

FOREIGN PATENT DOCUMENTS

| | | |
|---|---|---|
| KR | 10-1323622 B1 | 11/2013 |
| KR | 10-2015-0065038 A | 6/2015 |
| KR | 10-1534751 B1 | 7/2015 |

\* cited by examiner

FRONT VEHICLE BODY STRUCTURE

CROSS-REFERENCE TO RELATED APPLICATION

This application claims priority to and the benefit of Korean Patent Application No. 10-2015-0178254 filed in the Korean Intellectual Property Office on Dec. 14, 2015, the entire contents of which are incorporated herein by reference.

BACKGROUND (a) Field of the Invention

The present invention relates to a front vehicle body structure and more particularly, to a front vehicle body structure formed by coupling space frames with each other.

(b) Description of the Related Art

Generally, a front vehicle body of a vehicle has a frame structure positioned forward of the vehicle in a longitudinal direction thereof to form an engine compartment. The front vehicle body of a vehicle includes a front end module that forms a front direction of an engine compartment and includes a cooling module and a head lamp. A front fender apron member forms left and right sides of the engine compartment and is provided therein with a suspension system and provides a cavity therein with a vehicle wheel. Further, a dash panel is disposed reward of the engine compartment and separates a passenger compartment and the engine compartment.

Moreover, front side members extend in a longitudinal direction of the vehicle in lower left and right sides of the engine compartment to reinforce a structural stiffness of the front vehicle body. A sub-frame is disposed at a lower portion of the front side member to be coupled with the front side member to mount and support an engine, a transmission, a suspension system and the like installed in the engine compartment.

Moreover, a high performance vehicle reduces a weight of a vehicle body to improve the driving performance of the vehicle. For example, a high performance vehicle includes a vehicle body formed by coupling space frames manufactured using a relatively light aluminum material as compared to steel for lightweight of the vehicle body. Currently, vehicles require an increase in the structural stiffness of the front vehicle body and an improvement of the R & H [please define] performance and drive performance of the vehicle by robustly connecting a front pillar member, a fender apron member, and a cowl member to each other.

The above information disclosed in this section is merely for enhancement of understanding of the background of the invention and therefore it may contain information that does not form the prior art that is already known in this country to a person of ordinary skill in the art.

SUMMARY

The present invention provides a front vehicle body structure having advantages of increasing a structural stiffness of a front vehicle body and improving R & H performance and drive performance of a vehicle by robustly connecting a front pillar member, a fender apron member, and a cowl member to each other through one joint.

An exemplary embodiment provides of a front vehicle body structure that may include fender apron upper members that extend in a longitudinal direction of a vehicle and are disposed within left and right sides of the front vehicle body in a width direction of the vehicle, respectively; front pillar members that extends in a transverse direction of the vehicle and disposed within the left and right sides of the front vehicle body in the width direction of the vehicle, respectively; a cowl upper cross reinforcing member that extends in the width direction of the vehicle; front pillar upper members configured to extend in a longitudinal direction of the vehicle, and are disposed within left and right sides of the front vehicle body in the width direction of the vehicle, respectively, and provided rearward of the longitudinal direction and upward of the transverse direction of the vehicle against the fender apron upper member; and a joint configured to be coupled with front ends of the fender apron upper members, the front pillar members, the front pillar upper members, and the cowl upper cross reinforcing member, respectively.

The front ends of the fender apron upper members, the front pillar members, the front pillar upper members, and the cowl upper cross reinforcing member may be inserted and coupled to an interior of the joint, respectively. The front vehicle body structure may further include a rear upper cross reinforcing member extends in the width direction of the vehicle to couple the left and right fender apron upper members to each other. The fender apron upper members, the front pillar members, the front pillar upper members, and the cowl upper cross reinforcing member may be formed with aluminum material.

The joint may include a joint body having a multilateral shape and a hood hinge mounting component disposed forward of the longitudinal direction of the vehicle of the joint body and may include a horizontal surface and a vertical wall and a hood hinge may be coupled to the hood hinge mounting component. The joint may further include a door hinge mounting component formed at an exterior surface in the width direction of the vehicle of the joint body in a form of a wall surface and may include a mounting aperture and a door hinge may be positioned at the door hinge mounting component.

The joint may further include a cowl cross bar mounting component disposed to abut the door hinge mounting component in the exterior surface and may include a mounting aperture and a cowl cross bar may engage with the cowl cross bar mounting component to be supported. The joint may further include a reinforcing rib that couples the mounting aperture to each other and protrudes toward the exterior in the width direction of the vehicle. A reinforcing rib may be radially formed at an interior surface toward an interior side of the width direction of the vehicle of the joint body.

A first coupling groove may be positioned to include toward a front lower portion of the vehicle in the transverse direction of the vehicle of the joint body in an upper portion of the joint to couple a front end of the front pillar upper member with the first coupling groove. A second coupling groove may be formed at an interior surface of the joint body toward an interior side of the width direction of the vehicle of the joint body to insert and couple a top end of the front pillar member in the transverse direction of the vehicle. The fender apron upper members may be inserted into an interior of the joint body and may adhere an interior surface of the front pillar member in the width direction of the vehicle of the front pillar member and may be coupled with the interior surface of the front pillar member and the joint body, respectively.

The front pillar upper member may have multi-sections disposed to abut each other. The multi-sections may be formed with sections having a square shape share adjacent partition walls. A plurality of radial reinforcing ribs may be formed beneath the hood hinge mounting component of the joint body. A mounting boss may protrude within an interior of the front pillar member in the door hinge mounting component.

An assemble boss may protrude in the cowl cross bar and an assemble bolt may be inserted into the assemble boss to engage the assemble boss with the cowl cross bar. The cowl cross bar may include a flange and the flange may extend in the longitudinal direction and the transverse direction of the vehicle through an assembley bolt formed through the flange and may engage with a side exterior panel disposed on the exterior of the width direction of the vehicle.

In accordance with the front vehicle body structure according to an exemplary embodiment of the present invention, a structural stiffness of the vehicle body may be increased by connecting the front pillar member, a fender apron member, and a cowl member to each other through one joint formed by an extrusion material. Since a separate reinforcement material is not required due to the increase of the structural stiffness of the vehicle body, a weight of the vehicle, the number of components and manufacturing costs may be reduced. Further, a twisting stiffness of the front vehicle body may be increased to improve the R & H performance and drive stability of the vehicle. Due to the increased stiffness of the front vehicle body, passengers may be safely protected when an accident that involves a vehicle collision occurs. For example, the stiffness of the passenger compartment may reduce passenger injuries when a rollover of the vehicle occurs.

A coupling strength between vehicle body members and a joint may be increased by coupling a front pillar member, a fender apron member, and a cowl member that are manufactured in an extrusion process and a joint manufactured by a die casting process. A manufacturing cost of the front vehicle body and a weigh of the vehicle body may be reduced by optimizing a shape of a joint manufactured by a die casting process with a high manufacturing cost.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Hereinafter, an exemplary embodiment of the present invention will be described with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
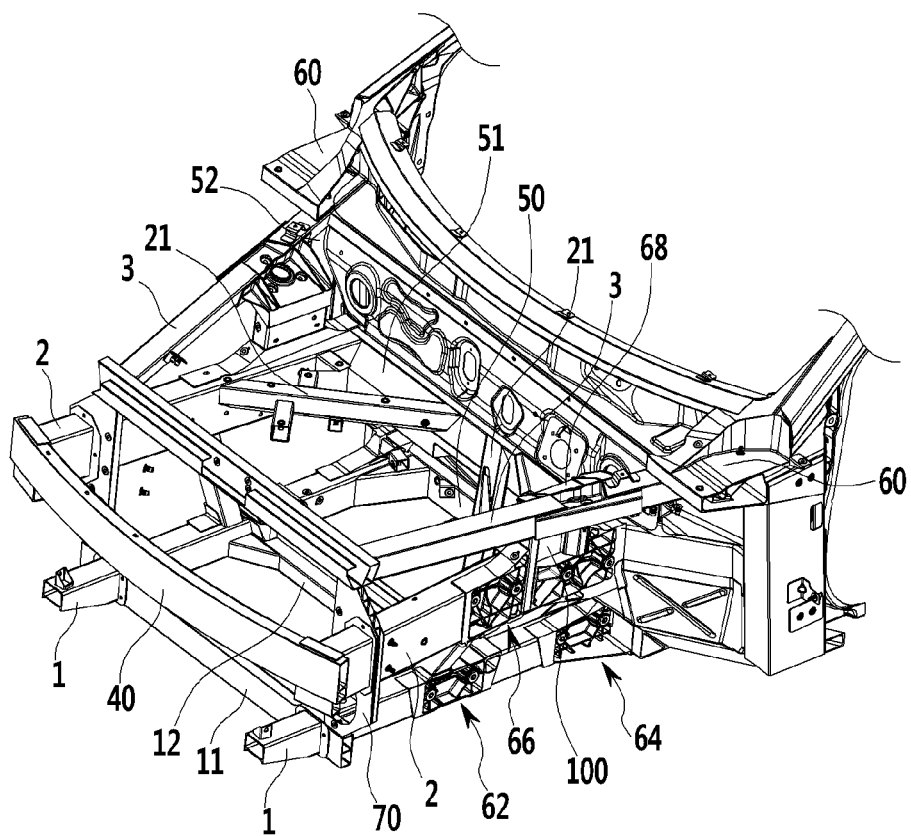
FIG. 1 is an exemplary perspective view illustrating a front vehicle body structure according to an exemplary embodiment of the present invention.
Figure 2:
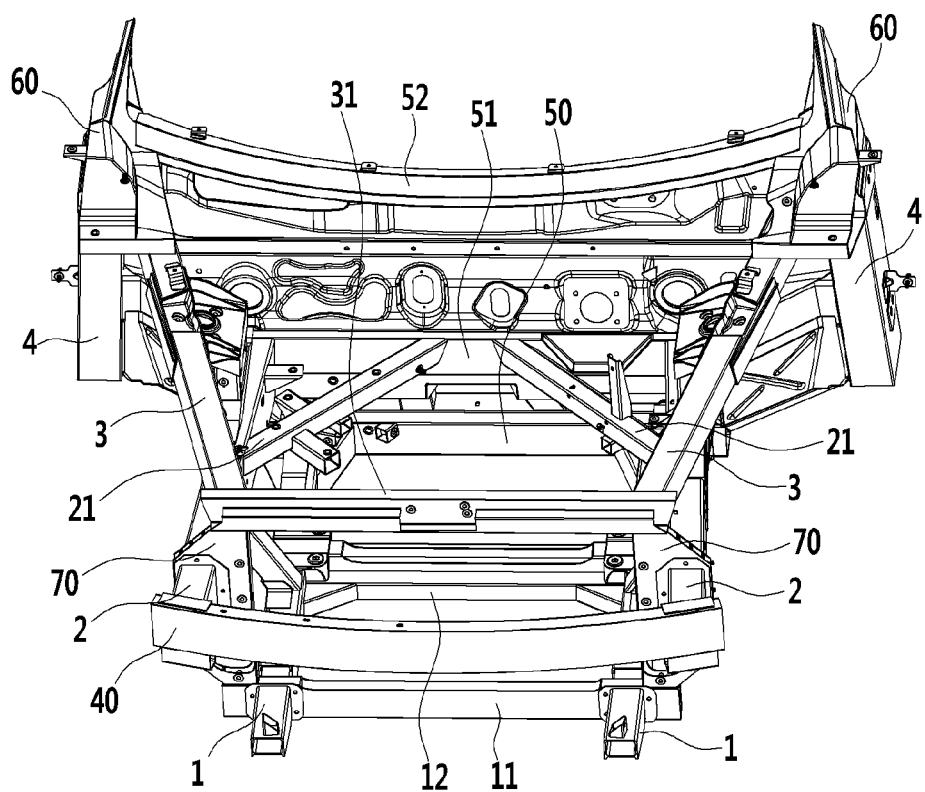
FIG. 2 is an exemplary plan view illustrating the front vehicle body structure according to an exemplary embodiment of the present invention.
Figure 3:
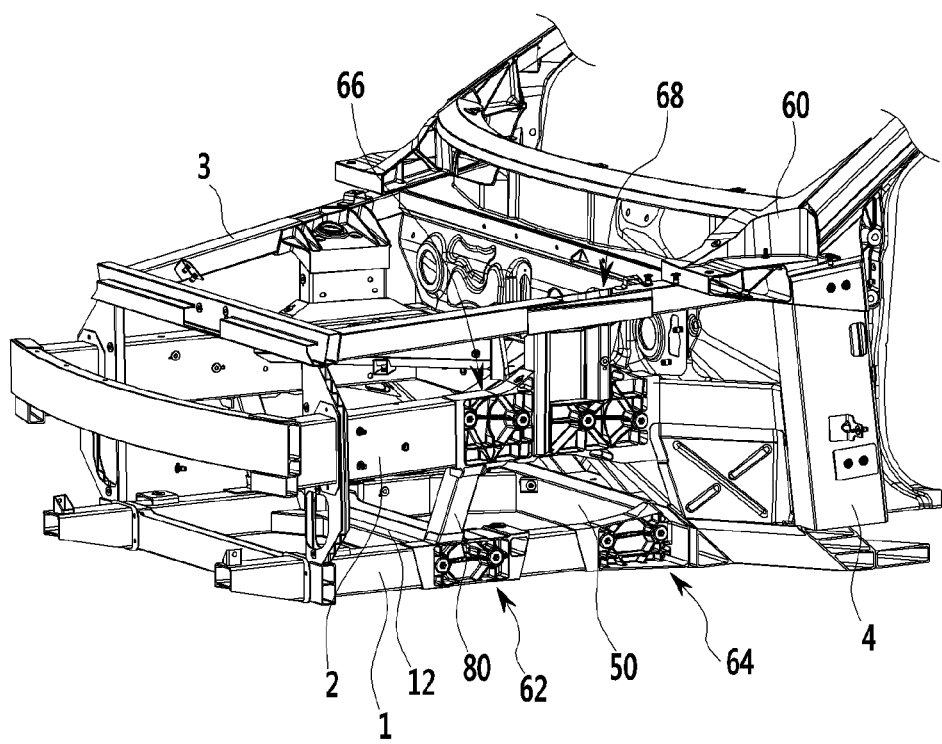
FIG. 3 is an exemplary enlarged perspective view illustrating the front vehicle body structure according to an exemplary embodiment of the present invention.

Referring to FIG. 1 to FIG. 3, a front vehicle body structure according to an exemplary embodiment of the present invention may include a front lower side member 1, a front upper side member 2 and a fender apron upper member 3 to extend in a longitudinal direction of a vehicle.

In a transverse direction of the vehicle the front lower side member 1 may be disposed at a bottom portion, the front upper side member 2 may be disposed at a center region, and the fender apron upper member 3 may be disposed at a top portion. The front regions in a longitudinal direction of the vehicle of left and right front lower side members 1 may be coupled to each other via a front lower cross reinforcing member 11 that may extend in a width direction of the vehicle. Center regions may be coupled to each other by a center lower cross reinforcing member 12 extending in the width direction of the vehicle. Rear regions may be coupled to each other by a dash lower cross reinforcing member 50 that extends in the width direction of the vehicle. The front regions in a longitudinal direction of the vehicle of left and right front upper side members 2 may be coupled to each other by a bumper member 40 extending in the width direction of the vehicle. Rear regions may be connected to each other by a dash center cross reinforcing member 51 extending in the width direction of the vehicle.

The left and right front upper side members 2 and the dash center cross reinforcing 51 may be coupled to each other by two inclined reinforcing members 21 that are inclined toward the width direction and the longitudinal direction of the vehicle. Two inclined reinforcing members 21 may be inclined toward an exterior side of a width direction from a center region in a longitudinal direction (e.g., the width direction of the vehicle) of the dash center cross reinforcing member 51 and may be coupled to the left and the right front upper side members 2.

Referring to FIG. 2, the front upper side member 2 may be disposed to widen to an exterior side of the width direction compared to the front lower side member 1. Accordingly, since the front upper side member 2 may adsorb and reduce impact energy when a front overlap collision accident of the vehicle occurs, the overlap collision response performance may be improved. Two front pillar members 4 that extend in a transverse direction of the vehicle may be disposed at left and right sides in the width direction of the vehicle.

Front regions of the left and right fender apron upper members 3 in a longitudinal direction of the vehicle of left and right front upper side members 2 may be coupled to each other via a front upper cross reinforcing member 31 that extends in the width direction of the vehicle. A front end of a rear direction may be coupled to the left and right front pillar members 4 via first joints 60. Both ends of a cowl upper cross reinforcing member 52 extending in a width direction of the vehicle may be coupled with left and right first joints 60.

Figure 4:
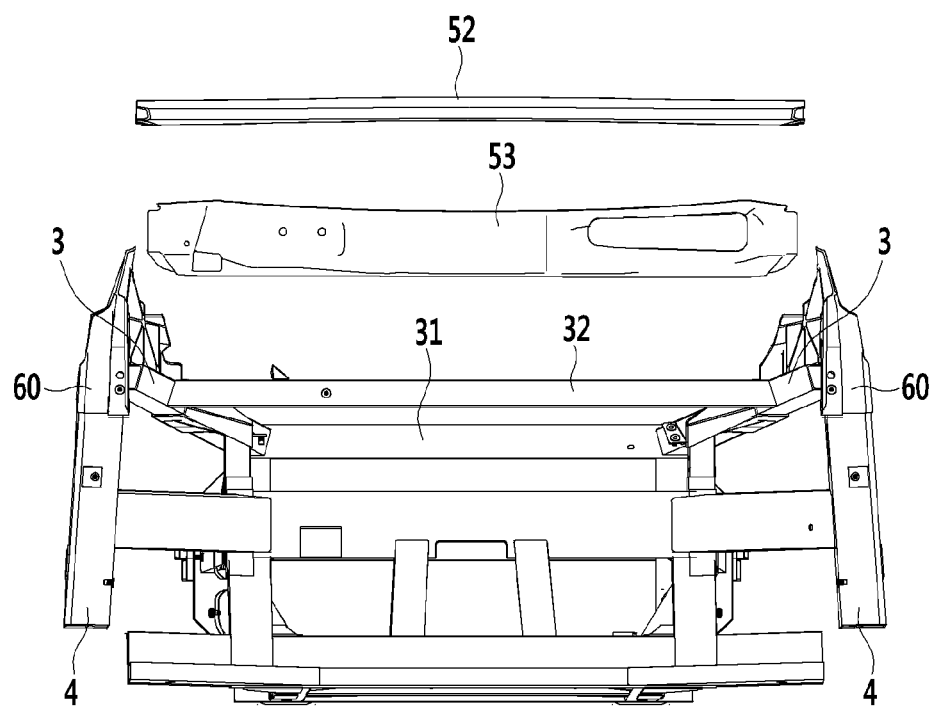
FIG. 4 is an exemplary exploded perspective view illustrating the a rear portion of front vehicle body structure according to an exemplary embodiment of the present invention.

Referring to FIG. 4, rear regions of the left and right fender apron upper members 3 in a longitudinal direction of the vehicle may be coupled to each other via a rear upper cross reinforcing member 32 that extends in the width direction of the vehicle. A cowl panel 53 that extends in the width direction of the vehicle may be interposed between the cowl upper cross reinforcing member 52 and the rear upper cross reinforcing member 32 to be integrally combined with the cowl upper cross reinforcing member 52 and the rear upper cross reinforcing member 32.

The front lower side member 1, the front upper side member 2, and the fender apron upper member 3 may be coupled to each other via a reinforcing panel 70 configured to extend in the transverse direction of the vehicle. The front lower side member 1 and the front upper side member 2 may be coupled to each other via a front side reinforcing member 80 configured to extend in the transverse direction of the vehicle in a substantially a center region in the longitudinal direction of the vehicle.

A second joint 62 may be coupled with a connected region of the front lower side member 1 with the center lower cross reinforcing member 12. A third joint 64 may be coupled with a connected region of the front lower side member 1 with the dash lower cross reinforcing member 50. A fourth joint 66 may be coupled with the front upper side member 2 and a fifth joint 68 may be coupled with the fender apron upper member 3. The first joint 60 to the fifth joint 68 may be formed from aluminum materials through a die casting process. Respective members may be manufactured from the aluminum materials through a die casting process.

Figure 5:
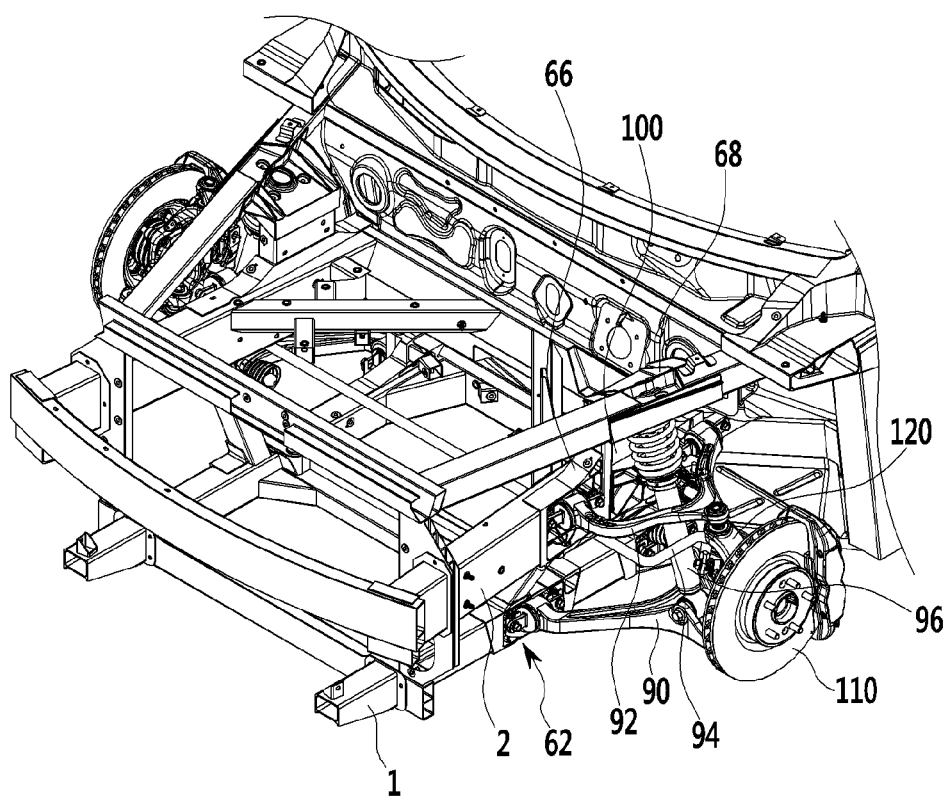
FIG. 5 is an exemplary perspective view illustrating a state where a suspension device is installed in the front vehicle body structure according to an exemplary embodiment of the present invention.

Referring to FIG. 5, both ends of a lower arm 90 configuring a suspension arm and may engage with the second joint 62 and the third joint 64 to be supported, respectively. Both ends of an upper arm 92 may be configured with a suspension arm and may be engaged with the fourth joint 66 to be supported, respectively. A stabilizer bar 94 may engage the fourth joint 66 to be supported and may extend in the width direction of the vehicle and may be configured to adjust a moment motion of the vehicle body.

The fourth joint 66 and the fifth joint 68 may be coupled to each other by a shock absorber mounting reinforcing member 100 and an upper portion of an absorber 96 that includes a suspension system may be coupled with the fifth joint 68 to be supported. Reference numeral 110 represents a brake disk configured to break a vehicle wheel which is not shown. Reference numeral 120 represents a knuckle to steer the vehicle wheel. A lower arm 90 and an upper arm 92 may be engaged with the knuckle 120 to be supported.

Figure 6:
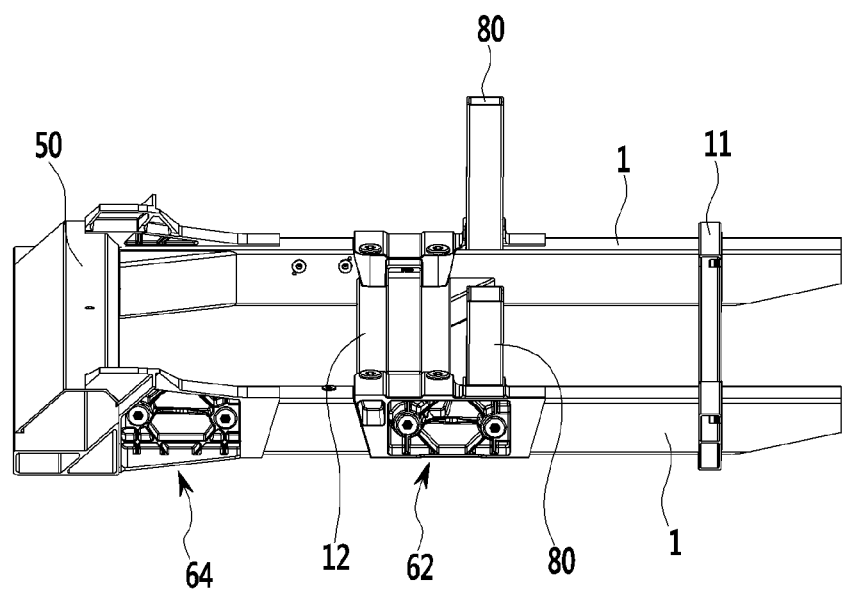
FIG. 6 is an exemplary perspective view illustrating a coupling state between a front lower side member and reinforcing members thereof in the front vehicle body structure according to an exemplary embodiment of the present invention.
Figure 7:
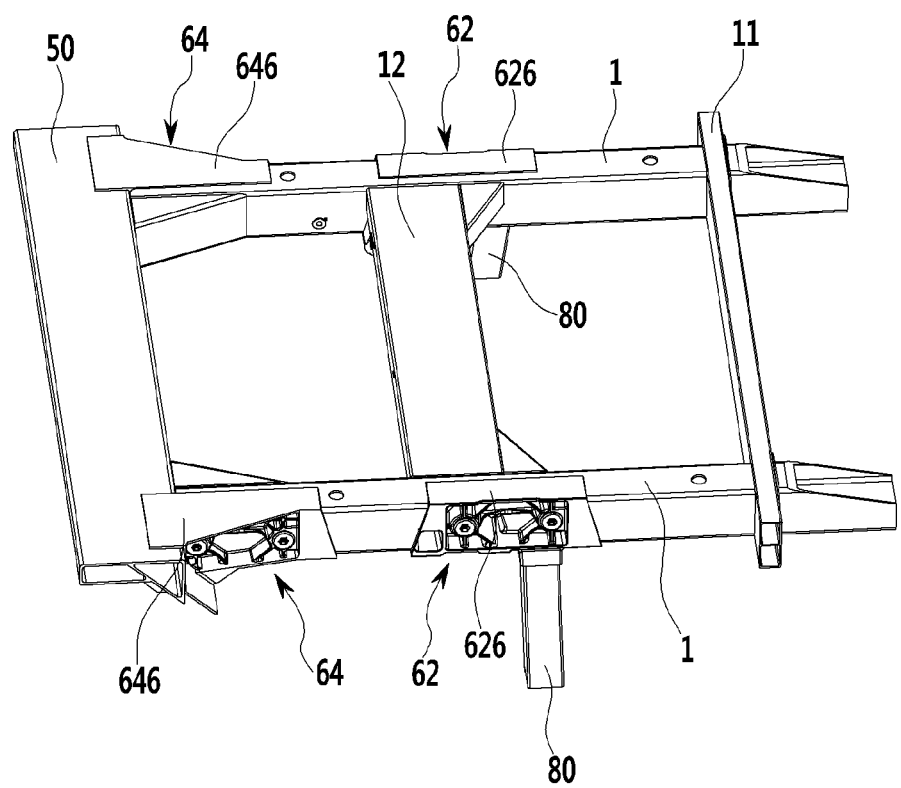
FIG. 7 is an exemplary perspective view illustrating a lower portion of FIG. 6 according to an exemplary embodiment of the present invention.
Figure 8:
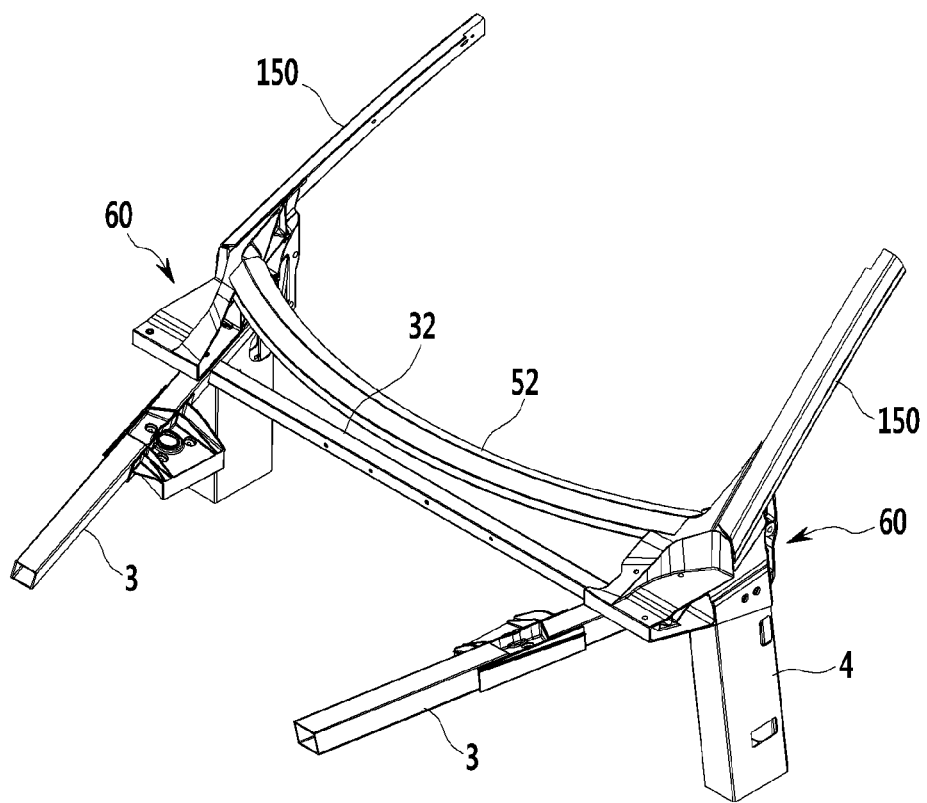
FIG. 8 is an exemplary perspective view illustrating main parts of the front vehicle body structure according to an exemplary embodiment of the present invention.
Figure 9:
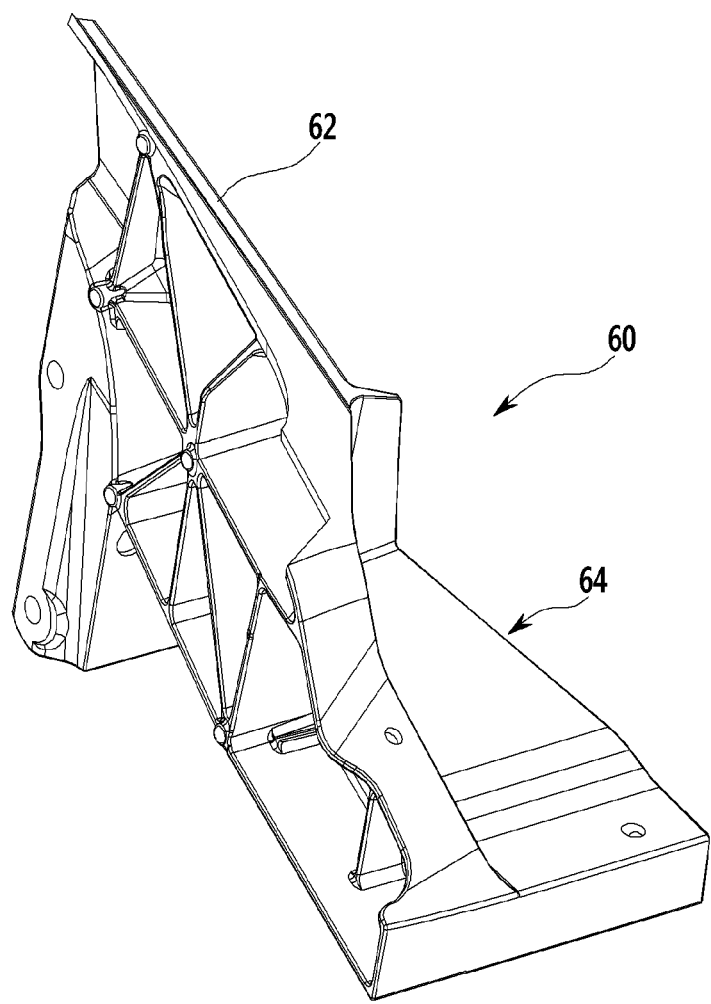
FIG. 9 is an exemplary perspective view illustrating a first joint according to an exemplary embodiment of the present invention.
Figure 10:
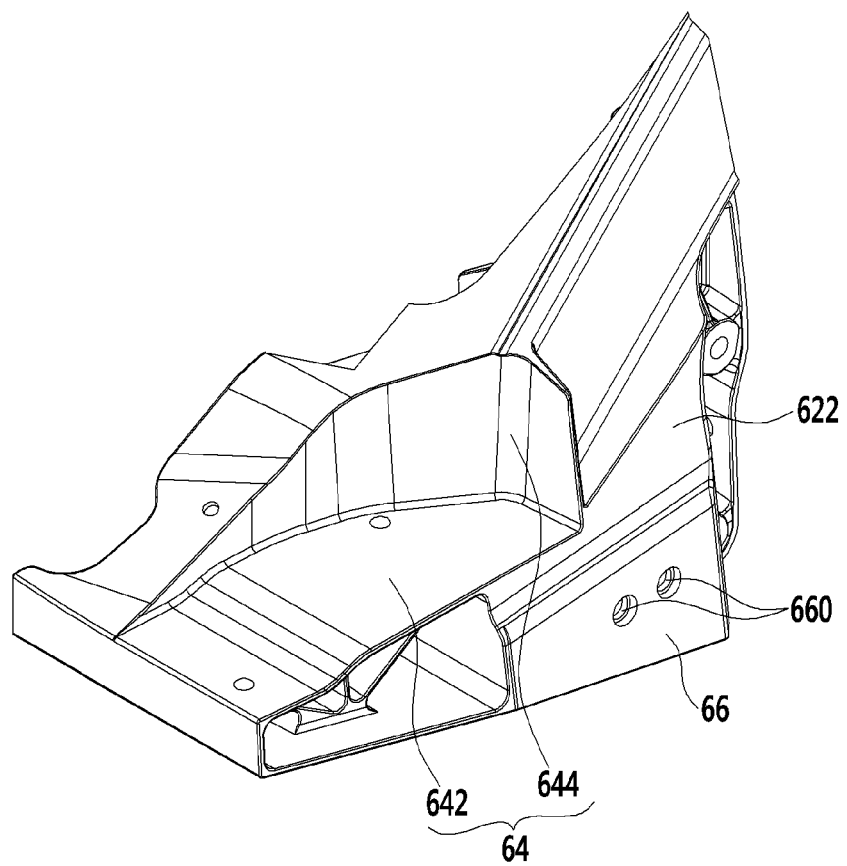
FIG. 10 is an exemplary perspective view illustrating the first joint viewed from another angle according to an exemplary embodiment of the present invention.

Referring to FIG. 6 and FIG. 7, the second joint 62 may be coupled with the front lower side member 1 and the center lower cross reinforcing member 12. The third joint 64 may be coupled with the front lower side member 1 and the dash lower cross reinforcing member 50. Referring to FIG. 8, the fender apron upper member 3, the front pillar member 4 that extends in a longitudinal direction of the vehicle, a rear upper cross reinforcing member 52, and a front pillar upper member 150 may be coupled with each other in the first joint 60. As described above, the fender apron upper member 3, the front pillar member 4, the rear upper cross reinforcing member 52, and the front pillar upper member 150 may be concentrated in one point and may be connected to each other through the first joint 60 to increase the stiffness of the front vehicle body structure.

Referring to FIG. 9 to FIG. 12, the first joint 60 may include a joint body 62 having a multilateral shape, a hood hinge mounting component 64 disposed forward of a longitudinal direction of a vehicle of the joint body 62 and may include a horizontal surface and a vertical wall, a door hinge mounting component 66 formed at an exterior surface in a width direction of the vehicle of the joint body 62 in the form of a wall surface and may include two mounting apertures 660 and a cowl cross bar mounting component 68 disposed to abut the door hinge mounting component 66 in the exterior surface 622 and may include two mounting apertures 680.

A plurality of reinforcing ribs 682 to couple the plurality of mounting apertures 680 to each other may protrude toward the exterior from the width direction of the vehicle. Further, a plurality of reinforcing ribs 626 that reinforce the stiffness of the joint body 62 may be radially formed in an interior surface 624 inward from the width direction of the vehicle. The plurality of reinforcing ribs 606 may support and distribute a load input to the first joint 60 and may increase the stiffness.

Figure 11:
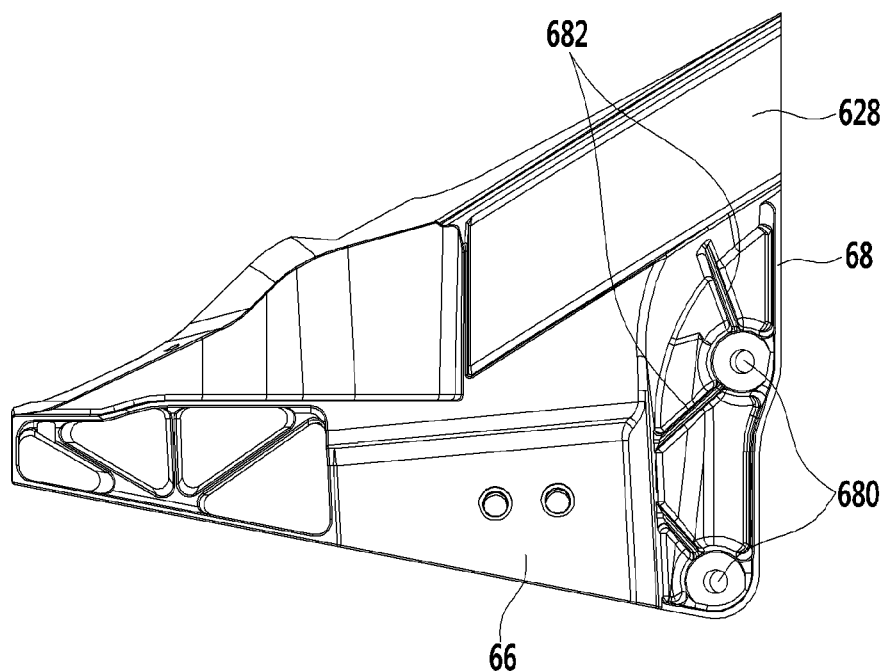
FIG. 11 is an exemplary front view illustrating a first joint according to an exemplary embodiment of the present invention.
Figure 13:
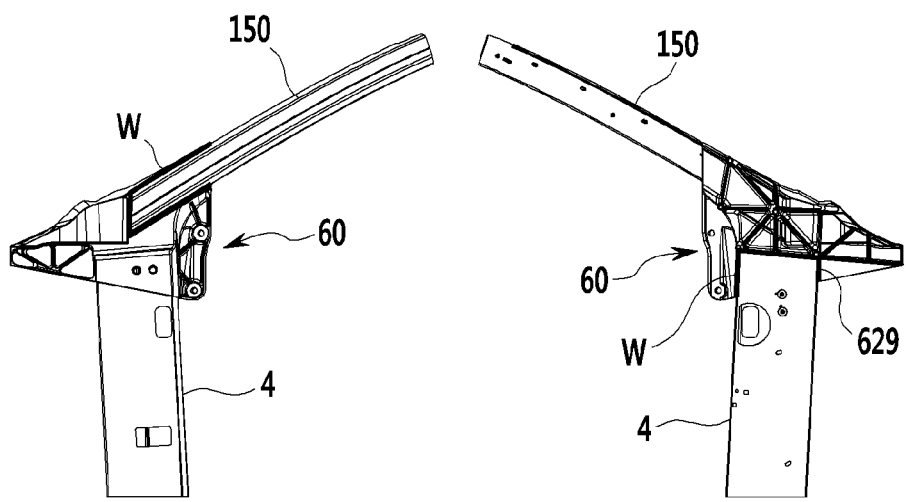
FIG. 13 is an exemplary side view illustrating the first joint with which a front pillar member and a front pillar upper member are coupled according to an exemplary embodiment of the present invention.

Referring to FIG. 11 and FIG. 13, a first coupling groove 628 may be inclined toward a front lower portion of the vehicle in the transverse direction of the vehicle of the joint body 62 in an upper portion of the first joint 60. A front end of the front pillar upper member 150 may be inserted into the first coupling groove 628 to couple the front pillar upper member 150 along an edge of the front end by welding (W). As described above, the front pillar upper member 150 may be inserted into an interior of the joint body 62 of the third joint body 60 and may be coupled by welding to improve a coupling stiffness.

Figure 12:
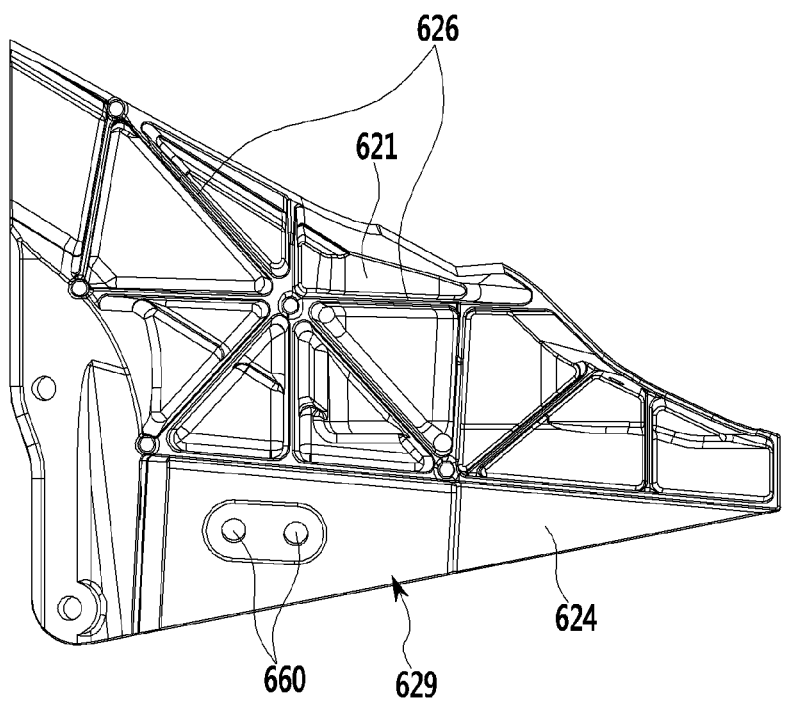
FIG. 12 is an exemplary bottom view illustrating a first joint according to an exemplary embodiment of the present invention.

Referring to FIG. 12 and FIG. 13, a second coupling groove 629 may be formed at an interior surface of the joint body 62. A top end of the front pillar member 4 in the transverse direction of the vehicle may be inserted into the second coupling groove 629 to couple the front pillar member 4 along an edge of the top end thereof by welding (W). As described above, the front pillar member 4 may be inserted into an interior of the joint body 62 of the third joint body 60 and may be coupled with the joint body 62 by welding to improve the coupling stiffness.

Figure 14:
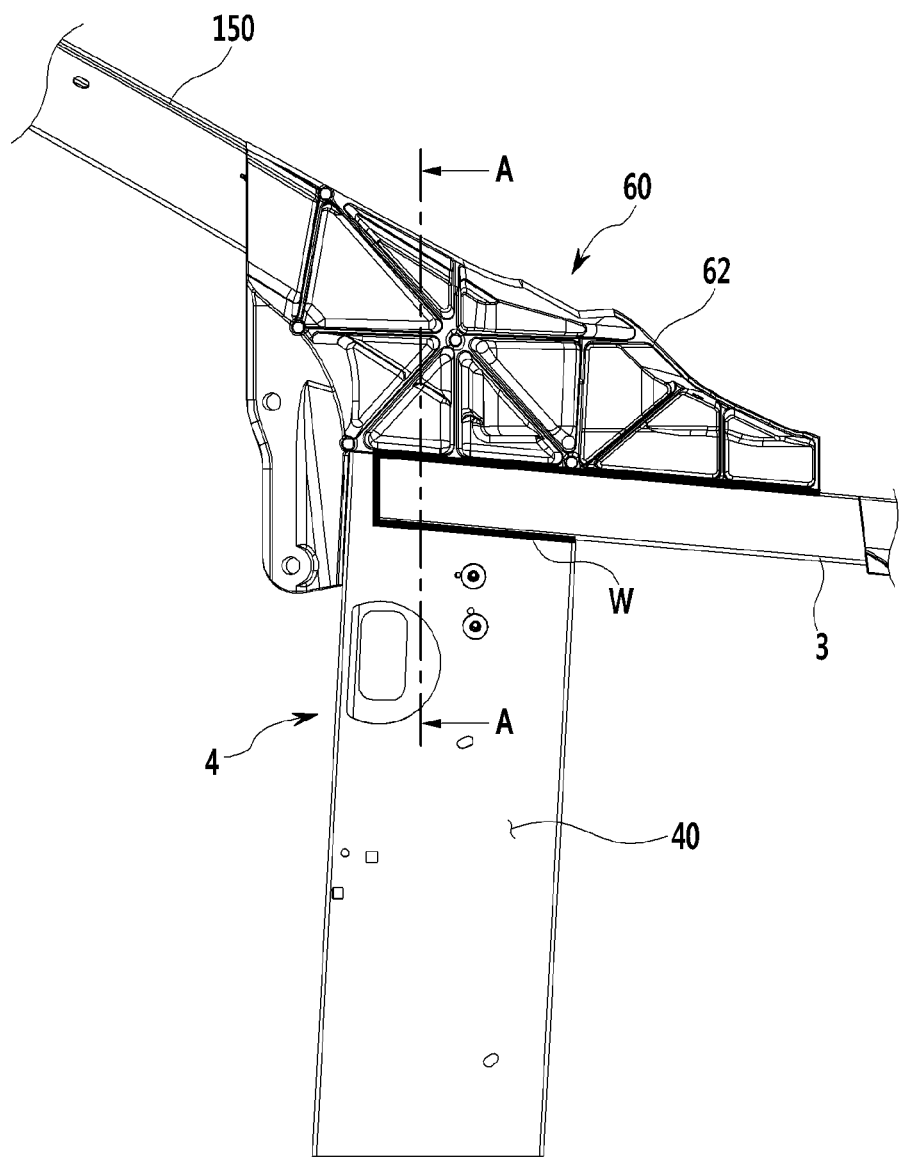
FIG. 14 is an exemplary enlarged view illustrating main parts of FIG. 13 according to an exemplary embodiment of the present invention.
Figure 15:
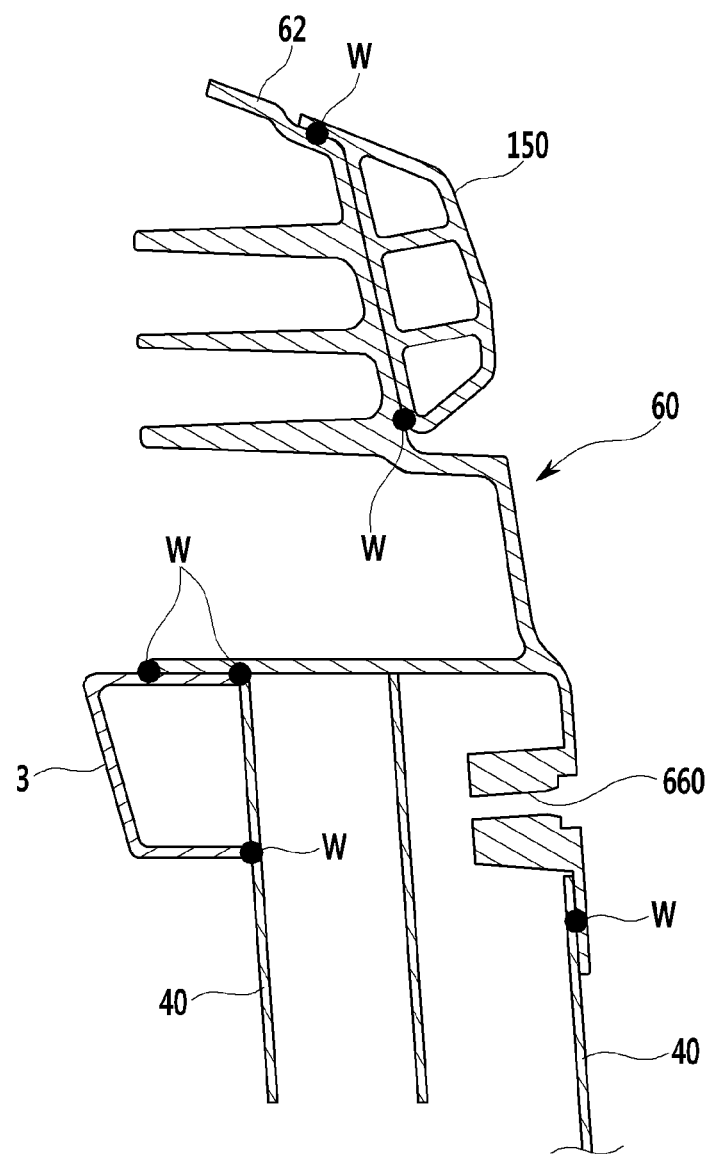
FIG. 15 is an exemplary cross-sectional view taken along line A-A of FIG. 14 according to an exemplary embodiment of the present invention.
Figure 16:
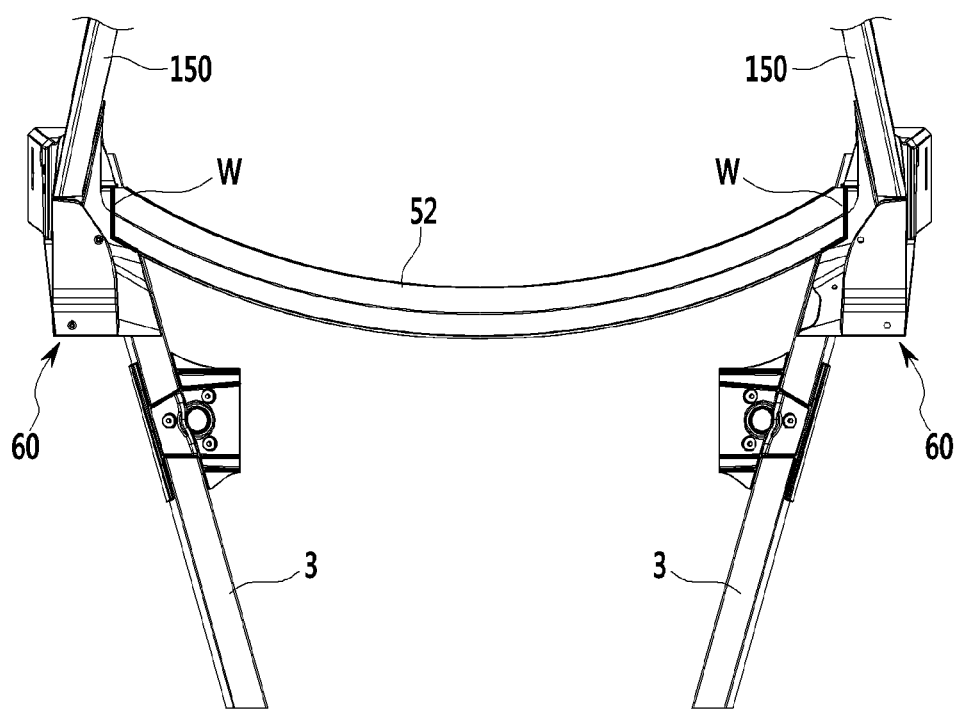
FIG. 16 is an exemplary plan view illustrating the first joint with which a front pillar upper member, a cowl upper cross reinforcing member, and a fender apron upper member are coupled according to an exemplary embodiment of the present invention.
Figure 17:
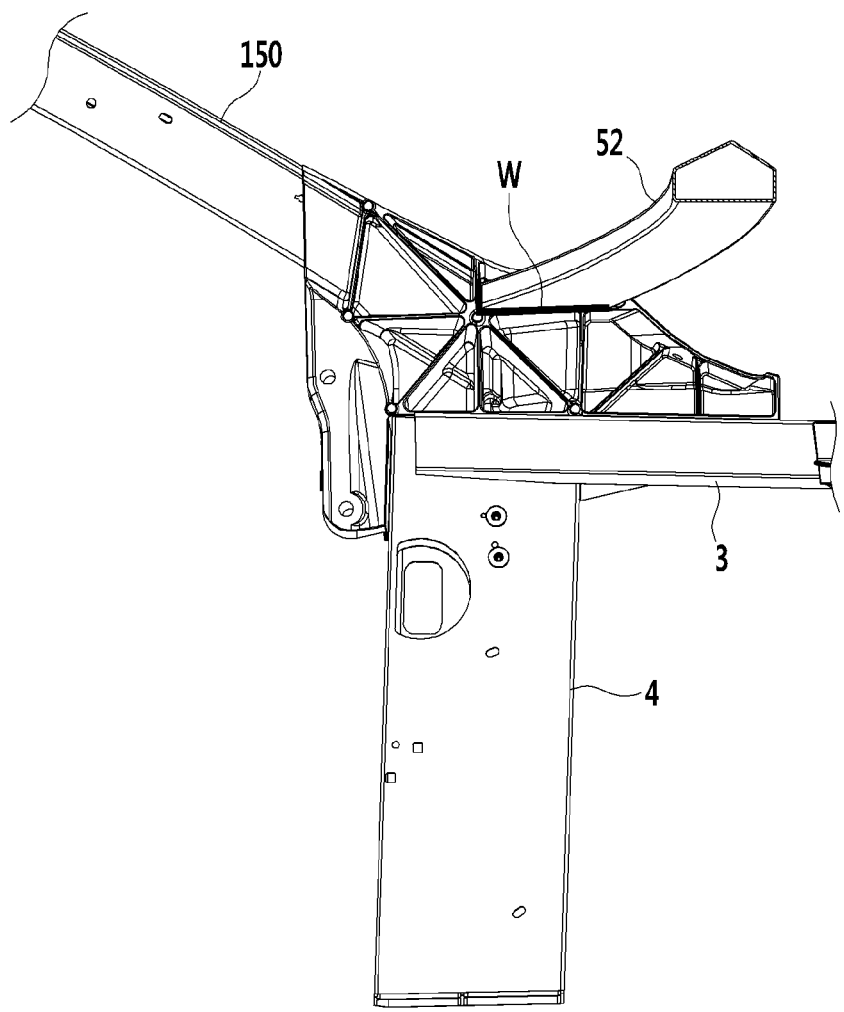
FIG. 17 is an exemplary enlarged view illustrating main parts of FIG. 16 according to an exemplary embodiment of the present invention.

Referring to FIG. 14 and FIG. 15, the fender apron upper member 3 may be inserted into the interior of the joint body 62 and may adhere an interior surface 40 in a width direction of the vehicle of the front pillar member 4 and may be coupled with the interior surface 40 of the front pillar member 4 and the joint body 62 by welding (W), respectively. The front pillar upper member 50 may be formed by an extrusion material to have multi-sections. The multi-sections may be formed with three sections having a square shape share adjacent partition walls.

Figure 18:
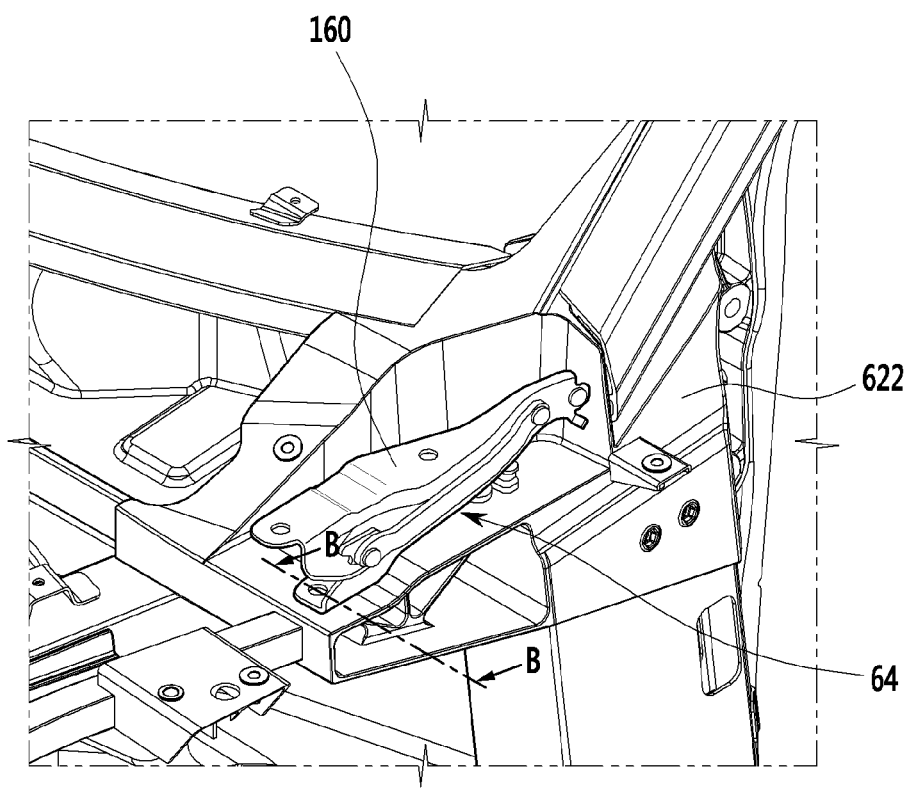
FIG. 18 is an exemplary perspective view illustrating the first joint at which a hood hinge is mounted according to an exemplary embodiment of the present invention.
Figure 19:
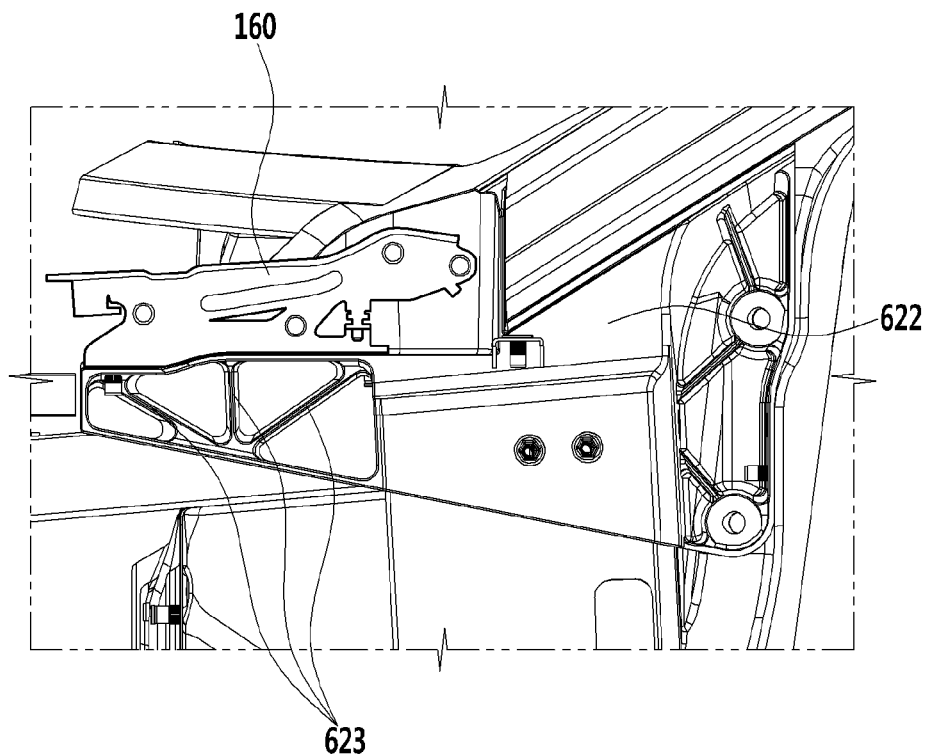
FIG. 19 is an exemplary side view of FIG. 18 according to an exemplary embodiment of the present invention.
Figure 20:
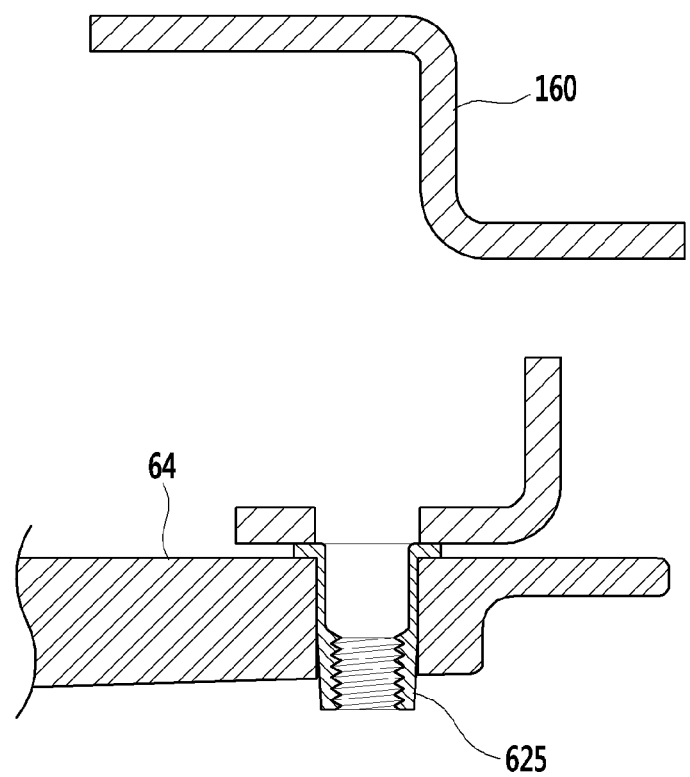
FIG. 20 is an exemplary cross-sectional view taken along line B-B of FIG. 18 according to an exemplary embodiment of the present invention.

Referring to FIG. 18 to FIG. 20, a hood hinge 160 may be disposed in the hood hinge mounting component 64 to support the hood hinge mounting component 64. An assemble nut 625 may be inserted via the hood hinge mounting component 64 to be attached thereto by welding. To reinforce the stiffness of the hood hinge mounting component 64 a plurality of radial reinforcing ribs 623 may be formed beneath the hood hinge mounting component 64 of the joint body 62. As described above, since separate reinforcing members or separate reinforcing structures by reinforcing the hood hinge mounting component 64 by a plurality of reinforcing ribs 623 are not required, the number of parts and a weight of the vehicle may be reduced.

Figure 21:
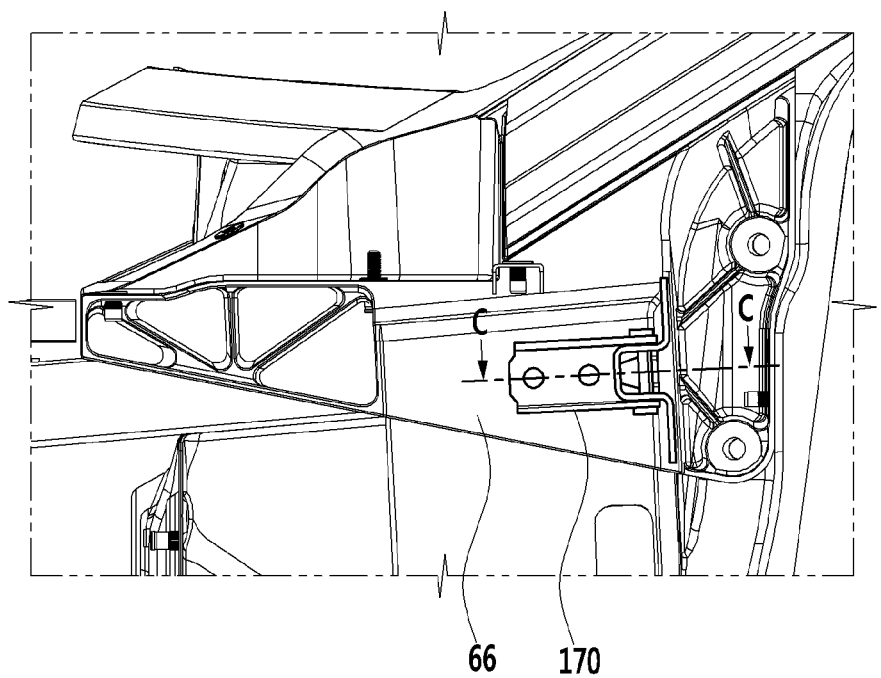
FIG. 21 is an exemplary side view illustrating the first joint at which a door hinge is mounted according to an exemplary embodiment of the present invention.
Figure 22:
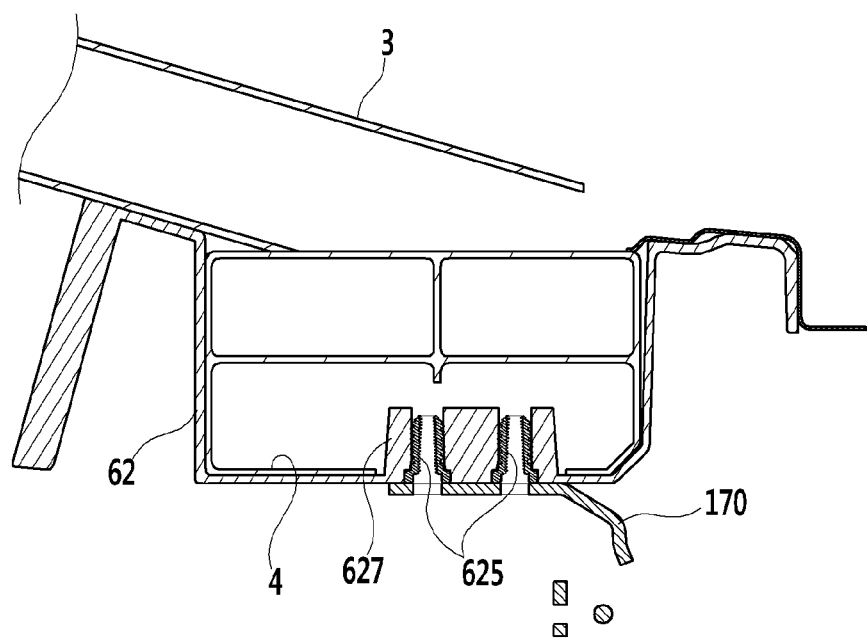
FIG. 22 is an exemplary cross-sectional view taken along line C-C of FIG. 21 according to an exemplary embodiment of the present invention.
Figure 23:
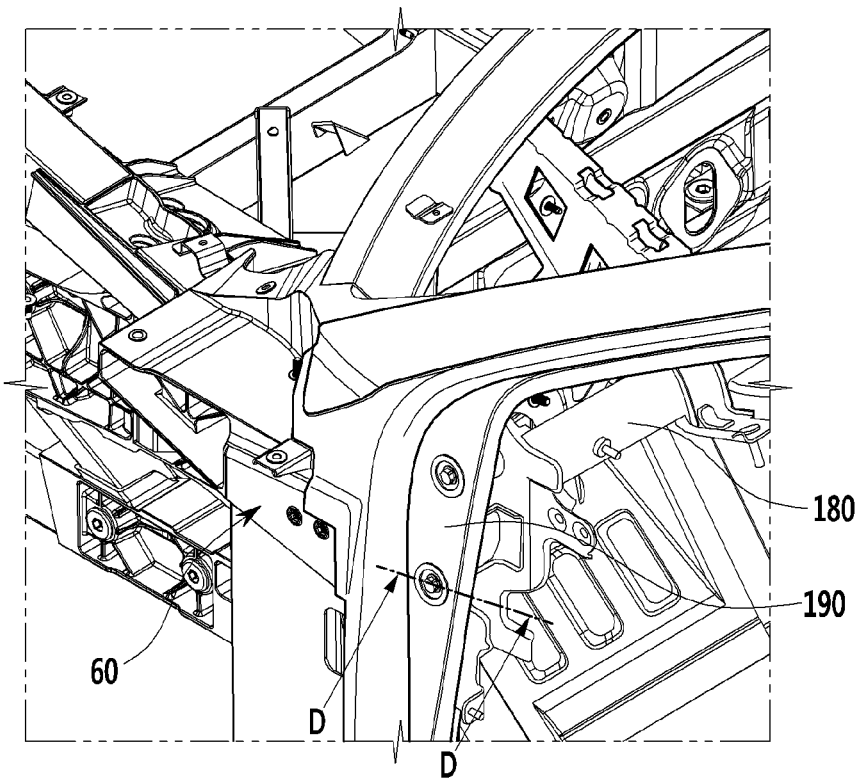
FIG. 23 is an exemplary perspective view illustrating the first joint with which a cowl cross bar is engaged according an exemplary embodiment of the present invention.
Figure 24:
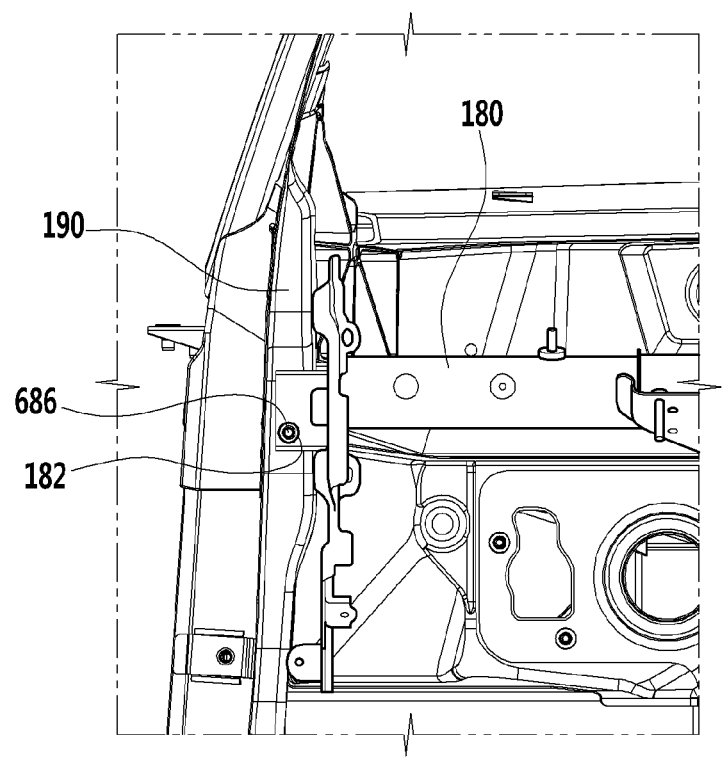
FIG. 24 is a side view of FIG. 23 according to an exemplary embodiment of the present invention.
Figure 25:
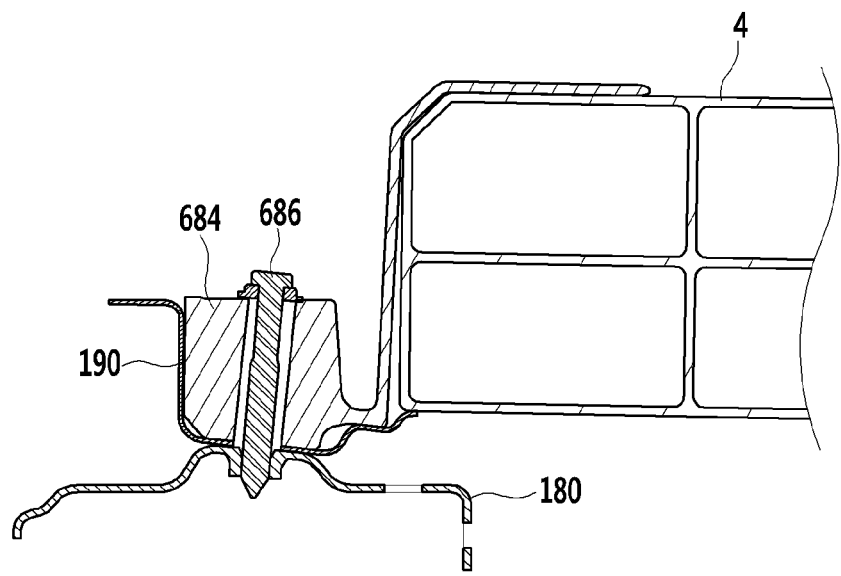
FIG. 25 is an exemplary cross-sectional view taken along line D-D of FIG. 23 according to an exemplary embodiment of the present invention.

Referring to FIG. 21 and FIG. 22, a door hinge 170 may be disposed within the door hinge mounting component 66 and may be configured to be engaged therewith. A mounting boss 627 may protrude into an interior of the front pillar member 4 around the mounting aperture 660 of a door hinge mounting component 66. An assemble nut 625 may be inserted into a mounting boss 627 to be coupled via a welding, to mount a door hinge 170 to be more stably supported without a separate reinforcing member and a separate reinforcing structure. Referring to FIG. 23 to FIG. 25, a cowl cross bar 180 may be engaged with the cowl cross bar mounting component 68. In other words, the cowl cross bar 180 may extend in a width direction of a vehicle.

An assemble boss 684 may protrude into a mounting aperture 680 of the cowl cross bar mounting component 68 and an assemble bolt 686 may be inserted into the assemble boss 684 to engage a cowl cross bar 180 with the assemble boss 684. Further, the cowl cross bar 180 may include a flange 182. The flange 182 may extend in a longitudinal direction and a transverse direction of the vehicle through an assemble bolt 686 formed through the flange 182 and may engage a side exterior panel 190 disposed outward from the width direction of the vehicle to be supported. In other words, a side panel 190 may be interposed between the cowl cross bar 180 and the assemble boss 684. As described above, a cowl cross bar 180 may be mounted to be more stably supported without a separate reinforcing member and a separate reinforcing structure.

Figure 26:
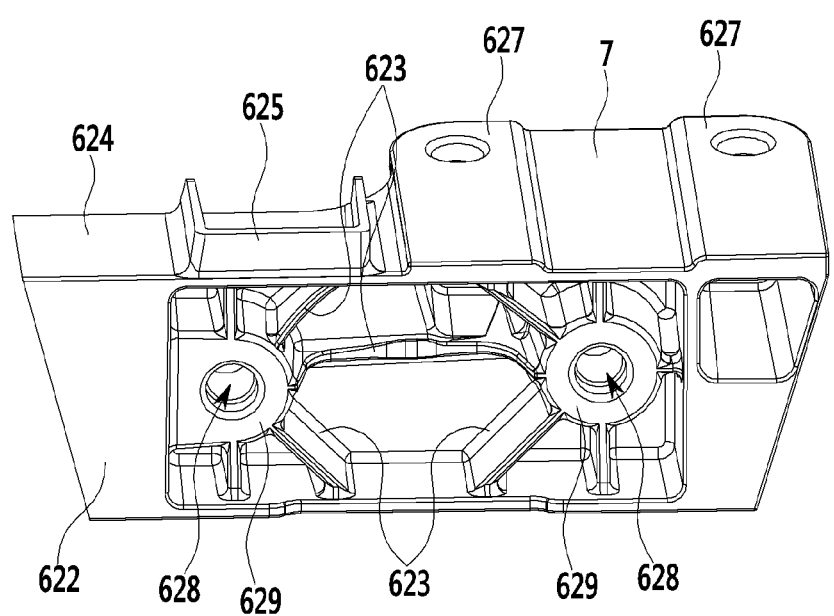
FIG. 26 is an exemplary perspective view illustrating a second joint of a front vehicle body structure according to an exemplary embodiment of the present invention.

Referring to FIG. 26, the second joint 62 may include a second joint body 622 having a substantially square plate shape, an upper flange 624 disposed toward the interior from the width direction of the vehicle from a top edge of the second joint body 622 that may be coupled with a top surface in the transverse direction of the vehicle of the front lower side member 1 and a lower flange 626 (see FIG. 7) bent toward the interior from the width direction of the vehicle from a bottom edge of the second joint body 622 that may be coupled with a bottom surface in the transverse direction of the vehicle of the front lower side member 1

A coupling flange 625 with an end of the front side reinforcing member 80 may be inserted and coupled and may protrude upward from the transverse direction of the vehicle in the upper flange 624. Further, the upper flange 624 may include two extension bosses 627 that extend inward of the width direction of the vehicle from the upper flange 624 and may be configured to engage a center lower cross reinforcing member 12 in two points. Two engagement bosses 629 may protrude in the second joint body 622 and may include two engagement apertures 628 disposed to be spaced around the longitudinal direction of the vehicle. An end of the lower arm 90 may be engaged and be coupled with two engagement apertures 628. A plurality of radial ribs 623 may integrally protrude in the second joint body 622 to increase a structural stiffness by the connection of two engagement bosses 629 to each other and may connect each engagement boss 629 to the second joint body 622.

Figure 27:
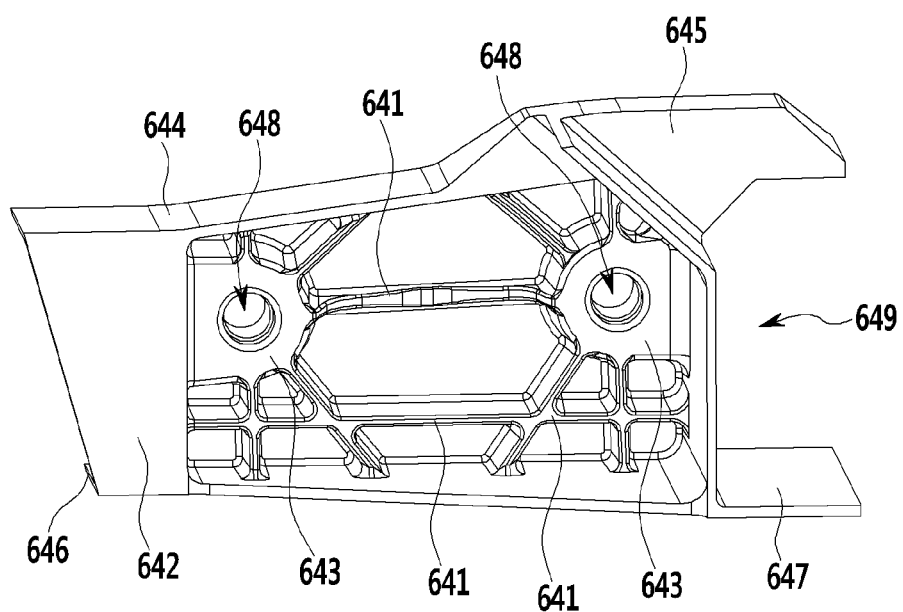
FIG. 27 is an exemplary perspective view illustrating a third joint of a front vehicle body structure according to an exemplary embodiment of the present invention.

Referring to FIG. 27, the third joint 64 may include a third joint body 642 with a substantially square plate shape, an upper flange 644 bent inward from the width direction of the vehicle from a top edge of the third joint body 642 to be coupled with a top surface in a transverse direction of the vehicle of the front lower side member 1, and a lower flange 646 (see FIG. 7) bent inward from the width direction of the vehicle from a bottom edge of the third joint body 642 that may be coupled with a bottom surface in the transverse direction of the vehicle from a bottom end edge of the third joint body 642.

The third joint 64 may further include an upper extension flange 645 that extends in a rear direction from a rear top end edge in a longitudinal direction of the vehicle of the third joint body 642 and may be disposed at an upper portion in the transverse direction of the vehicle. A lower extension flange 647 that extends in a rear direction from a rear bottom end edge in a longitudinal direction of the vehicle of the third joint body 642 and may be disposed at a lower portion in the transverse direction of the vehicle. A coupling groove 649 may be formed between the upper extension flange 645 and the lower extension flange 647. A dash lower cross reinforcing member 50 may be inserted and coupled with the coupling groove 649.

Two engagement bosses 643 may protrude in the third joint body 642 and may include two engagement apertures 648 disposed to be spaced around the longitudinal direction of the vehicle. A first or second end of the lower arm 90 may be configured to engage and couple the two engagement apertures 628. A plurality of radial ribs 641 may integrally protrude to the third joint body 642 to increase a structural stiffness by connection of two engagement bosses 623 to each other and by connection of each engagement boss 623 to the third joint body 642.

Figure 28:
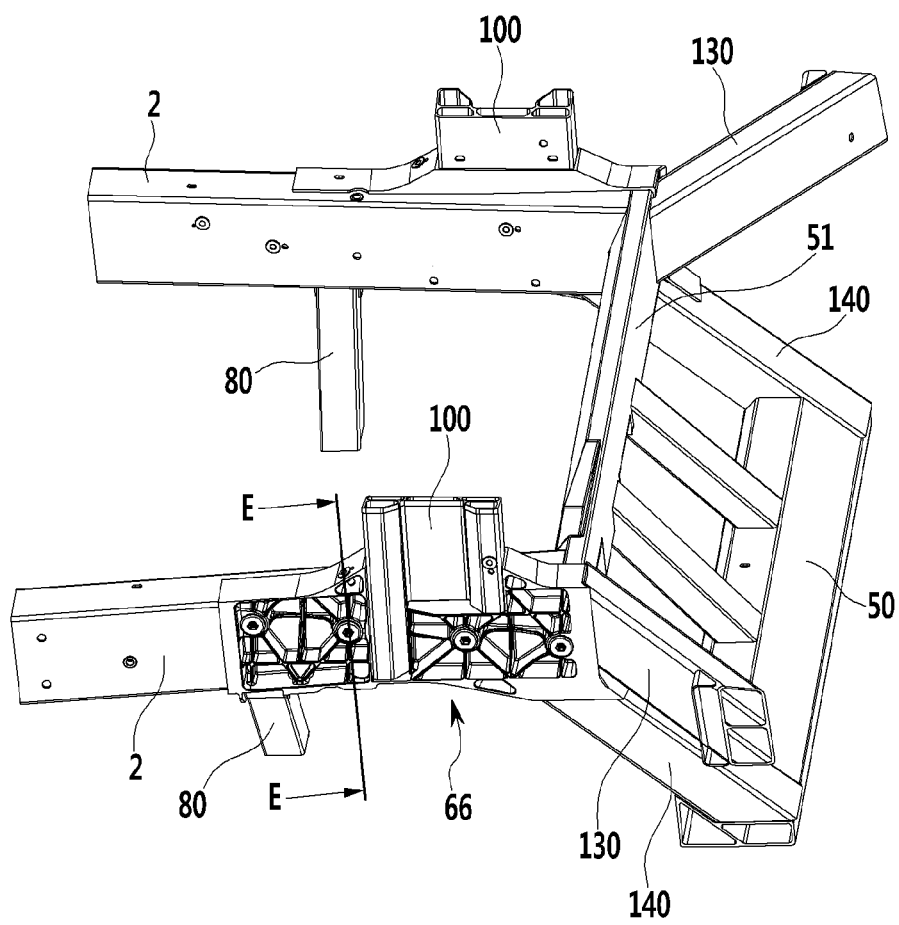
FIG. 28 is an exemplary perspective view illustrating a coupling state of a front upper side member and a dash cross reinforcing member of the front vehicle body structure according to an exemplary embodiment of the present invention.

Referring to FIG. 28, a dash center cross reinforcing member 51 may be coupled to the front pillar member 4 via a rear side reinforcing member 130. The front upper side member 2 may be connected to a dash cross reinforcing member 50 via a rear side lower reinforcing member 140. The fourth joint 66 may be mounted at the front upper side member 2, a front portion of the fourth joint 66 in a longitudinal direction of the vehicle may be coupled with the front side reinforcing member 80, a rear portion of the fourth joint 66 may be coupled with a rear side reinforcing member 130 and a rear side lower reinforcing member 140. A shock absorber mounting reinforcing member 100 may be inserted and coupled with an interior of the fourth joint 66.

Figure 29:
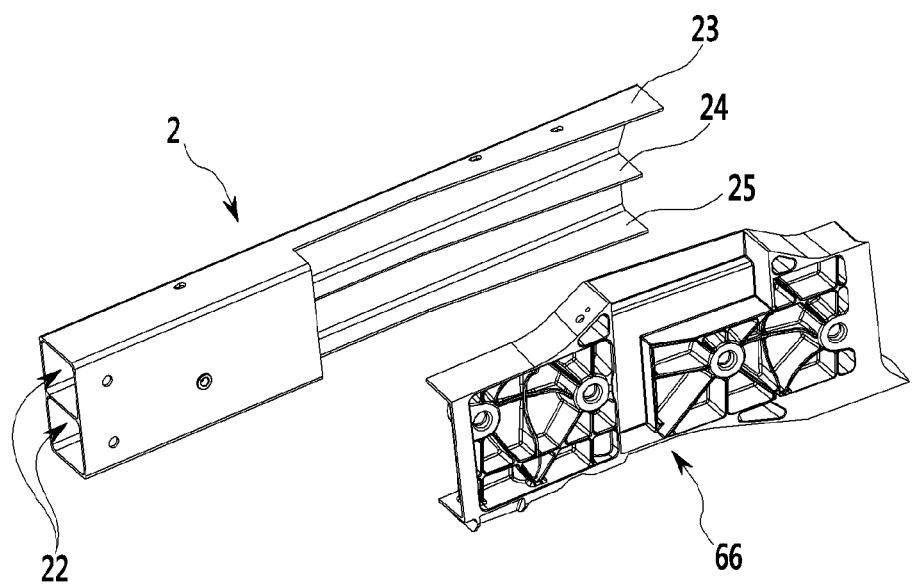
FIG. 29 is an exemplary exploded perspective view illustrating a front upper side member and a fourth joint of the front vehicle body structure according to an exemplary embodiment of the present invention.
Figure 30:
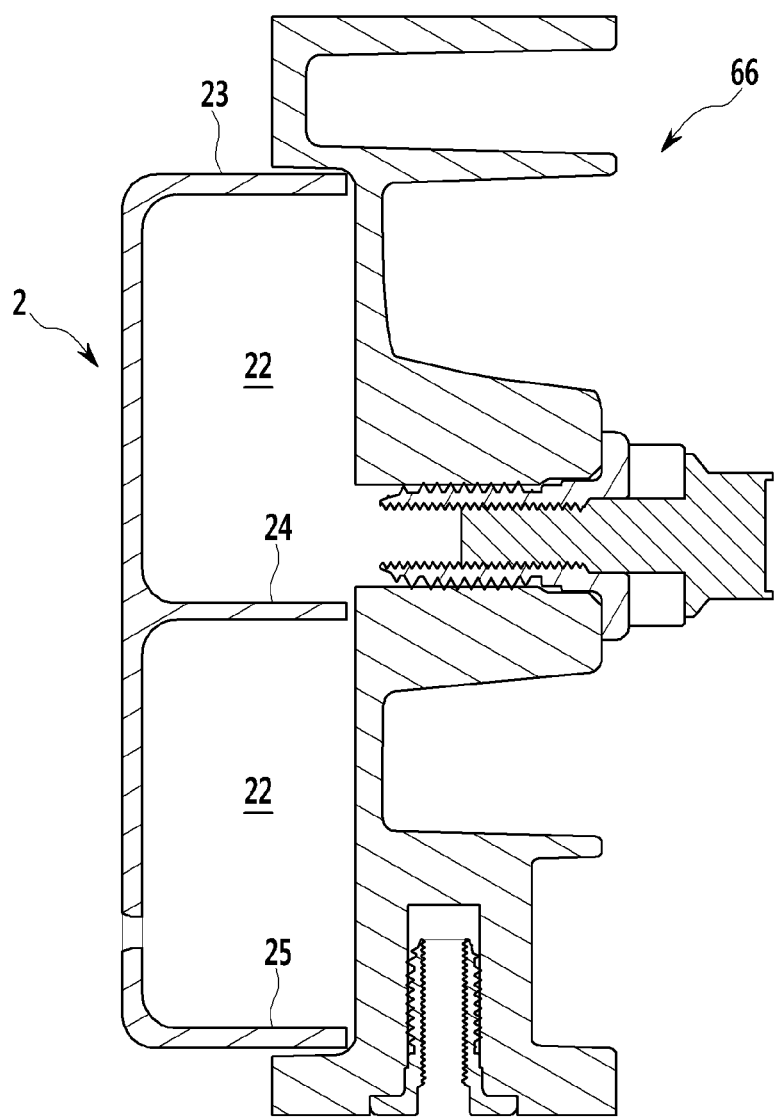
FIG. 30 is an exemplary cross-sectional view taken along line A-A of FIG. 29 according to an exemplary embodiment of the present invention.

Referring to FIG. 29 and FIG. 30, the front upper side member 2 may include double closed surfaces 22 configured to extend in the longitudinal direction (e.g., upward and downward). An upper wall 23, a center wall 24, and a lower wall 25 of the double closed surfaces 22 may be partially removed to be coupled with the front upper side member 2 by covering a cut region of the fourth joint 66.

Figure 31:
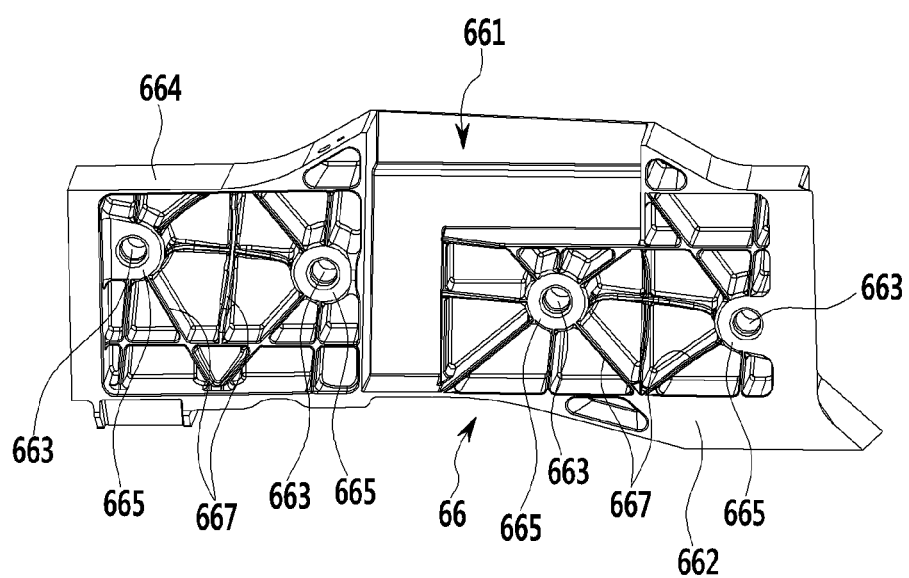
FIG. 31 is an exemplary perspective view illustrating a fourth joint of a front vehicle body structure according to an exemplary embodiment of the present invention.
Figure 32:
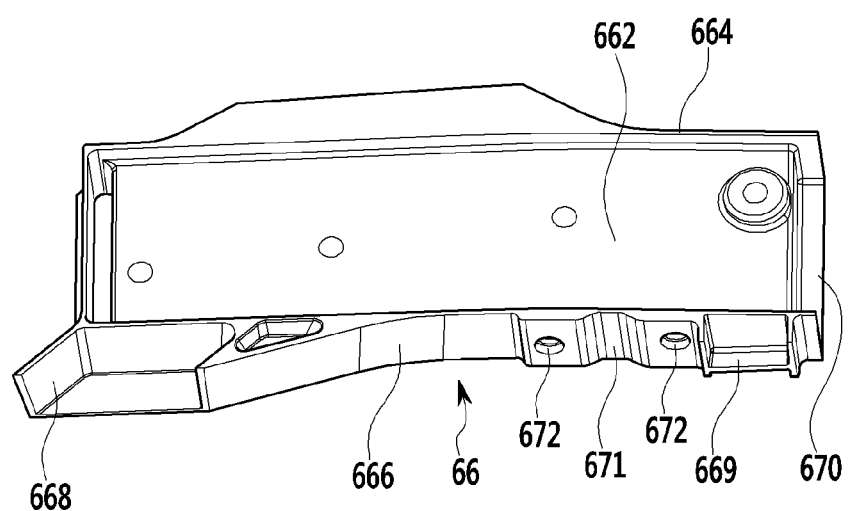
FIG. 32 is an exemplary perspective view illustrating a rear portion of the fourth joint of a front vehicle body structure according to an exemplary embodiment of the present invention.

Referring to FIG. 31 and FIG. 32, the fourth joint 66 may include a fourth joint body 662 having a substantially square plate shape, an upper flange 664 bent inward from the width direction of the vehicle from a top edge of the fourth joint body 662 coupled with a top surface in a transverse direction of the vehicle of the front upper side member 2 and a lower flange 666 bent inward from the width direction of the vehicle from a bottom edge of the fourth joint body 662 coupled with a bottom surface in the transverse direction of the vehicle from a bottom end edge of the fourth joint body 662.

A coupling groove 661 may be formed at a substantially center region of the fourth joint 66 in a longitudinal direction of the fourth joint body 662. A shock absorber mounting reinforcing member 100 may be inserted and coupled with the coupling groove 661. Two engagement bosses 665 having two engagement apertures 663 may be configured to engage an end of the upper arm 92 forward of a longitudinal direction of the vehicle based on the coupling groove 661. Two engagement bosses 665 having two engagement apertures 663 may be configured to engage a first or second end of the upper arm 92 rearward of a longitudinal direction of the vehicle based on the coupling groove 661. The two engagement bosses 663 may be coupled to each other via a plurality of radial reinforcing ribs 667 to increase the structural stiffness.

A lower flange 666 may include a first coupling flange 668 with which the front side reinforcing member 80 may be inserted and coupled. A second coupling flange 669 with which the rear side lower reinforcing member 140 may be inserted and coupled. A third flange 670 may be disposed at a rear end in the longitudinal direction of the fourth joint body 662 to insert and couple the rear side reinforcing member 130 with the third flange 670. The lower flange 666 may include a support groove 671 into which the stabilizer bar 94 may be inserted to be supported. Engagement apertures 672 may be configured to engage the stabilizer bar 94 with a lower flange 666 via a mounting bracket which is not shown. The first coupling flange 668, the second coupling flange 669 and the third coupling flange 67 may include a section having a substantially "⊏" (e.g., two parallel lines connected via a vertical line forming a right angle at each connection point) shape.

As mentioned above, an exemplary embodiment of the present invention is disclosed herein, but the present invention is not limited to the disclosed exemplary embodiments, but, on the contrary, is intended to cover various modifications and equivalent arrangements included within the appended claims and the detailed description and the accompanying drawing of the present invention.

DESCRIPTION OF SYMBOLS

1: front lower side member
2: front upper side member
3: fender apron upper member
4: front pillar member
11: front lower cross reinforcing member
12: center lower cross reinforcing member
21: inclined reinforcing member
31: front upper cross reinforcing member
32: rear upper cross reinforcing member
40: bumper beam
50: dash lower cross reinforcing member
51: dash center cross reinforcing member
52: cowl upper cross reinforcing member
53: cowl panel
60: first joint
62: second joint
64: third joint
66: Fourth joint
68: Fifth joint
70: Reinforcing panel
80: Front side reinforcing member
90: lower arm
92: upper arm
94: stabilizer bar
96: shock absorber
100: shock absorber mounting reinforcing member
130: rear side reinforcing member
140: rear side lower reinforcing member
150: front pillar upper member
160: door hinge
170: hood hinge
180: cowl cross bar
190: side exterior panel

What is claimed is:

1. A front vehicle body structure, comprising:
fender apron upper members that extend in a longitudinal direction of a vehicle, and are disposed in left and right sides of the front vehicle body in a width direction of the vehicle, respectively;
front pillar members configured that extend in a transverse direction of the vehicle, and are disposed in the left and right sides of the front vehicle body in the width direction of the vehicle, respectively;
a cowl upper cross reinforcing member configured that extends in the width direction of the vehicle;
front pillar upper members configured that extend in a longitudinal direction of the vehicle, and are disposed in left and right sides of the front vehicle body in the width direction of the vehicle, respectively, and positioned rearward of the longitudinal direction and upward of the transverse direction of the vehicle against the fender apron upper member;
a joint configured to be coupled with front ends of the fender apron upper members, the front pillar members, the front pillar upper members, and the cowl upper cross reinforcing member, respectively; and
a rear upper cross reinforcing member configured to extend in the width direction of the vehicle to couple the left and right fender apron upper members to each other.

2. The front vehicle body structure of claim 1, wherein the front ends of the fender apron upper members, the front pillar members, the front pillar upper members, and the cowl upper cross reinforcing member are configured to be inserted and coupled with an interior of the joint, respectively.

3. The front vehicle body structure of claim 1, wherein the fender apron upper members, the front pillar members, the front pillar upper members, and the cowl upper cross reinforcing member are formed by an aluminum material.

4. The front vehicle body structure of claim 1, wherein the joint includes:
a joint body having a multilateral shape; and
a hood hinge mounting component disposed forward of the longitudinal direction of the vehicle of the joint body and having a horizontal surface and a vertical wall,
wherein a hood hinge is mounted at the hood hinge mounting component.

5. The front vehicle body structure of claim 4, wherein the joint further includes: a door hinge mounting component disposed at an exterior surface in the width direction of the vehicle of the joint body in a form of a wall surface and having a mounting aperture; and
a door hinge is disposed at the door hinge mounting component.

6. The front vehicle body structure of claim 5, wherein the joint includes:
a cowl cross bar mounting component that abuts the door hinge mounting component in the exterior surface and having at least one mounting aperture; and
a cowl cross bar engaged with the cowl cross bar mounting component to be supported.

7. The front vehicle body structure of claim 6, wherein the joint includes a reinforcing rib configured to connect the mounting aperture to each other and protrudes outward of the width direction of the vehicle.

8. The front vehicle body structure of claim 4, wherein a reinforcing rib is radially formed at an interior surface toward an interior side of the width direction of the vehicle of the joint body.

9. The front vehicle body structure of claim 4, wherein a first coupling groove is configured to be inclined toward a front lower portion of the vehicle in the transverse direction of the vehicle of the joint body in an upper portion of the joint to couple a front end of the front pillar upper member with the first coupling groove.

10. The front vehicle body structure of claim 4, wherein a second coupling groove is formed at an interior surface of the joint body toward an interior side of the width direction of the vehicle of the joint body to insert and couple a top end of the front pillar member in the transverse direction of the vehicle.

11. The front vehicle body structure of claim 4, wherein the fender apron upper members are inserted into an interior of the joint body and coupled with an interior surface of the front pillar member in the width direction of the vehicle of the front pillar member, and are coupled with the interior surface of the front pillar member and the joint body, respectively.

12. The front vehicle body structure of claim 3, wherein the front pillar upper member have multi-sections that abut each other.

13. The front vehicle body structure of claim 12, wherein the multi-sections are formed to include that sections having a square shape share adjacent partition walls.

14. The front vehicle body structure of claim 4, wherein a plurality of radial reinforcing ribs are formed under the hood hinge mounting component of the joint body.

15. The front vehicle body structure of claim 5, wherein a mounting boss protrudes into an interior of the front pillar member in the door hinge mounting component.

16. The front vehicle body structure of claim 6, wherein an assemble boss protrudes in the cowl cross bar and an assemble bolt is inserted into the assemble boss to engage the assemble boss with the cowl cross bar.

17. The front vehicle body structure of claim 16, wherein the cowl cross bar includes a flange and the flange is configured to extend in the longitudinal direction and the transverse direction of the vehicle through an assemble bolt formed through the flange and is engaged with a side exterior panel disposed on the exterior of the width direction of the vehicle.

\* \* \* \* \*